US010261558B2

(12) United States Patent
Benson

(10) Patent No.: US 10,261,558 B2
(45) Date of Patent: Apr. 16, 2019

(54) MODULE COMMUNICATIONS VIA POWER DELIVERY BUSES

(71) Applicant: Hewlett-Packard Development Company, L.P., Houston, TX (US)

(72) Inventor: Roger D. Benson, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 64 days.

(21) Appl. No.: 15/494,629

(22) Filed: Apr. 24, 2017

(65) Prior Publication Data

US 2018/0307287 A1 Oct. 25, 2018

(51) Int. Cl.
G06F 13/20 (2006.01)
G06F 1/26 (2006.01)
G06F 13/42 (2006.01)
G06F 13/38 (2006.01)
G06F 1/3287 (2019.01)

(52) U.S. Cl.
CPC ............ *G06F 1/266* (2013.01); *G06F 1/3287* (2013.01); *G06F 13/385* (2013.01); *G06F 13/4282* (2013.01)

(58) Field of Classification Search
CPC .... G06F 1/266; G06F 1/3287; G06F 13/4282; G06F 13/385
See application file for complete search history.

(56) References Cited

U.S. PATENT DOCUMENTS

| 5,602,839 | A | * | 2/1997 | Annapareddy | ......... | H04L 45/04 370/405 |
| 8,327,114 | B1 | * | 12/2012 | Cismas | ............... | G06F 11/1423 712/11 |
| 2010/0325325 | A1 | | 12/2010 | Fernald et al. | | |
| 2011/0140911 | A1 | * | 6/2011 | Pant | ........................ | H04B 3/546 340/870.02 |
| 2014/0208134 | A1 | * | 7/2014 | Waters | ................... | G06F 13/385 713/310 |
| 2014/0354079 | A1 | | 12/2014 | Bailey et al. | | |
| 2015/0370299 | A1 | | 12/2015 | Waters | | |

OTHER PUBLICATIONS

Jones, M., Power System Management Addressing, http://cds.linear.com/docs/en/application-note/an152f.pdf > (Jul. 12, 2016).

* cited by examiner

*Primary Examiner* — Jing-Yih Shyu
(74) *Attorney, Agent, or Firm* — Rathe Lindenbaum LLP

(57) ABSTRACT

An example modular computing system may include a host unit. The host unit may include a port that includes a data bus and a power delivery bus. The system may further include a controller to populate a message delivery routing table. The message delivery routing table may include a first address for a first module directly connected to the host unit by the port and a second address for a second module indirectly connected to the host unit by the first module. The controller is to communicate with the second module across the power delivery bus based upon the message delivery routing table.

20 Claims, 9 Drawing Sheets

| A1 | A2 | A3 | A4 | A5 | A6 | A7 | A8 | A9 | A10 | A11 | A12 |
|---|---|---|---|---|---|---|---|---|---|---|---|
| GND | TX1+ | TX1- | VBus | CC1 | D+ | D- | SBU1 | VBus | RX2- | RX2+ | GND |
| GND | RX1+ | RX1- | VBus | SBU2 | D- | D+ | CC2 | VBus | TX2- | TX2+ | GND |
| B12 | B11 | B10 | B9 | B8 | B7 | B6 | B5 | B4 | B3 | B2 | B1 |

MODULE COMMUNICATIONS VIA POWER DELIVERY BUSES

BACKGROUND

Various electronic devices such as computing units, memory storage devices, displays and the like communicate with one another using various connectors. Many connectors additionally facilitate the transmission of specifications for the delivery of power between the devices. One example of such a connector is a Universal Serial Bus type C connector.

BRIEF DESCRIPTION OF THE DRAWINGS

FIG. 6 is a schematic diagram of an example port of a device of an example modular computing system.

DETAILED DESCRIPTION OF EXAMPLES

Figure 1:
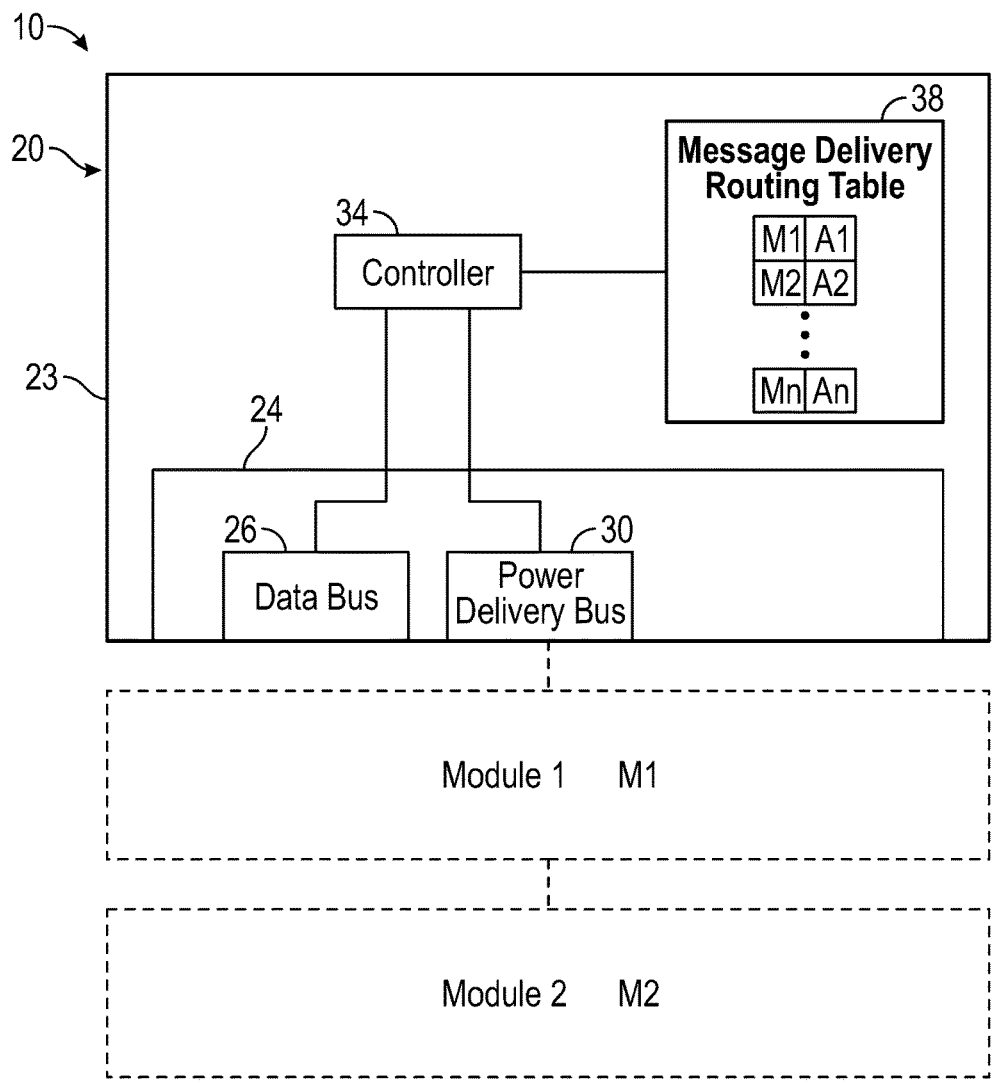
FIG. 1 is a block diagram schematically illustrating portions of an example host unit of an example modular computing system.

Modular computing systems comprise a tree of connected devices, wherein the different connected devices provide different functions or upgrades to the overall system. For example, such modular computing systems may comprise a host unit having a central processing unit and various modules that provide supplemental functionality such as speakers, a display, additional input/output ports, an optical disc drive or a memory storage such as a hard disc drive. The connected devices frequently communicate with one another across a data bus of each device. In some systems, power may be the supplied from one device to an adjacent connected device. The characteristics of the supplied power are often specified by signals transmitted in a point-to-point fashion across a power delivery bus of the adjacent devices. When a connected device is in a low-power state, such as a sleep state, communication between the devices across the data bus may be limited or not available.

Disclosed herein is an example modular computing system having a tree of connected devices that facilitates communication between non-adjacent devices of the tree across the power delivery bus of the non-adjacent devices. Such communication may be carried out while a host device or modules of the tree are in a low-power state. In some implementations, information other than power specifications, such as power button events and power light emitting diode events, may be sent across the power delivery bus of the non-adjacent devices of the tree. In such implementations, other configuration or user interface events between the host and any non-adjacent device or between two non-adjacent modules in the device tree may also be transmitted across the power delivery bus.

Disclosed herein is an example modular computing system that includes a host unit. The host unit may include a data bus and a power delivery bus. The host unit may further comprise a controller to populate a message delivery routing table. The message delivery routing table may include a first address for a first module directly connected to the host unit by the port and a second address for a second module indirectly connected to the host unit by the first module. The controller is to communicate with the second module across the power delivery bus based upon the message delivery routing table.

Disclosed herein is an example modular computing system that includes a first module to be connected to a host unit. The first module may include an upstream Universal Serial Bus (USB) type C connector port and a downstream Universal Serial Bus type C port. The first module may further include a controller that transmits a message from a second module connected to the first module by the downstream Universal Serial Bus type C port to a third module connected to the first module by the upstream Universal Serial Bus type C port across the power delivery bus of the upstream Universal Serial Bus type C port.

Disclosed herein is an example method for facilitating communication between non-adjacent devices in a modular computing system. The method may include populating a message delivery routing table, wherein the routing table may include a first address for first module directly connected to a host unit and a second address for a second module indirectly connected to the host unit by the first module. The method may further include transmitting a message to the second module across the power delivery bus of the host unit.

Disclosed herein is an example method for facilitating communication between non-adjacent devices in a modular computing system. The method may include actuating a host unit to a low-power state in which a power delivery bus remains inactive and in which data buses become inactive. While in the low-power state, the host unit receives a message from a module that has been indirectly connected to the host unit while the host unit was in the low-power state and wherein the message was received across a power delivery bus. The method may further include storing, with the host unit, an address for the module while the host unit remains in the low-power state.

FIG. 1 is a block diagram schematically illustrating portions of an example host unit 20 for a modular computing system 10. Host unit 20 may be connected to multiple modules directly or indirectly. For example, as illustrated in broken lines, host unit 20 may be directly connected to a first module M1 and may be indirectly connected to a second module M2 by the intervening first module M1. Host unit 20 communicates with the second module M2 across a power delivery bus.

As shown by FIG. 1, host unit 20 comprises a housing or enclosure 23 having a port 24 that facilitates connection with at least one data bus 26 and a power delivery bus 30 of host unit 20. Data bus 26 facilitates the transmission of data to downstream devices or modules. For example, such data transmission may be according to USB 2.0 or USB 3.0 specifications or modes. Power delivery bus 30 facilitates the communication of power delivery specifications. In one implementation, the at least one data bus 26 and the power delivery bus 30 are provided as part of a Universal Serial Bus type C receptacle interface. For example, the least one data bus 26 may comprise the TX1+, TX1−, RX1+, RX1−, TX2+, TX2−, RX2+ and RX2− pins or contacts of a Universal Serial Bus type C receptacle or plug. The power delivery bus 30 may comprise the CC1 and CC2 pins or contacts (sometimes referred to as configuration channels) of a Universal Serial Bus type C receptacle or plug. In other implementations, at least one data bus 26 and the power delivery bus 30 are provided as part of other types of connectors, plugs or receptacle interfaces.

Host unit 20 further comprises controller 34 and message delivery routing table 38. Controller 34 comprises a processing unit that follow the instructions contained in a non-transitory computer-readable medium and/or logic elements/circuitry within the housing of host unit 20. Controller 34 controls the transmission of messages and routing of messages from and the receipt of messages by host unit 20. For example, in one implementation, controller 34 may operate in various alternate modes wherein data buses are repurposed using different messaging protocols having different structured vendor defined messages. Controller 34 may further operate in an alternate mode having structured vendor defined messages communicated across the power delivery bus.

Controller 34 may control additional functions or operations of host unit 20 as well. For example, in one implementation, controller 34 may comprise a central processing unit which carries out various operations such as operating system events and performance of various applications. For example, controller 34 may issue commands pertaining to the display of information, the printing of information or the storage of information using modules they may be directly or indirectly connected to host unit 20.

Controller 34 facilitates transmission of messages or other communication between host unit 20 and modules indirectly connected to host unit 20 across or using power delivery bus 30 pursuant to an alternate mode based upon structured vendor defined messages. Controller 34 is connected to a memory of host unit 20 to populate message delivery routing table 38. Message delivery routing table 38 comprises a storage of addresses for different modules directly or indirectly connected to host unit 20. In one implementation, message delivery routing table 38 comprises a lookup table. In other implementations, message delivery routing table 38 may have other storage forms. Host unit 20 may communicate with modules indirectly connected to host unit 20, such as module M2, across power delivery bus 30 based upon the address for module M2 stored in routing table 38. In one implementation, as modules are added to system 10 and connected to host unit 20, directly or indirectly, configuration identification data or information is transmitted to host unit 20 across the power delivery bus 30. This information may be utilized by host unit 20 to further populate message delivery routing table 38 for future communications.

Figure 2:
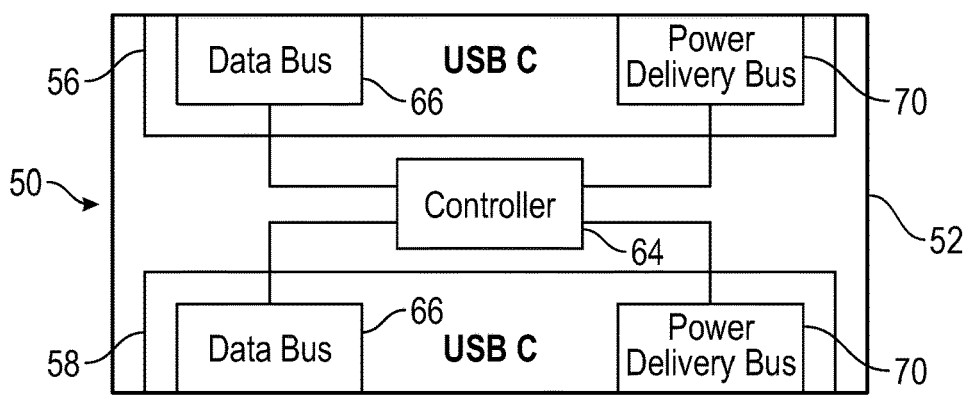
FIG. 2 is a block diagram schematically illustrating portions of an example module for use in the modular computing system of FIG. 1.

FIG. 2 is a block diagram schematically illustrating portions of an example module 50 that may be utilized in a modular computing system, such as system 10. Module 50 is to be connected, directly or indirectly to host unit 20 described above. Module 50 may provide additional supplemental functions or capabilities to host unit 20 or system 10. For example, in one implementation, module 50 may comprise a display device, an input/output module, an optical disk drive, a hard disk drive or a communication module.

As shown by FIG. 2, module 50 comprises a housing 52, connector port 56, connector port 58 and controller 64. Housing 52 comprises an enclosure about the components of module 50. Housing 52 includes openings providing access to connector ports 56, 58.

Connector port 56 comprises an "upstream" facing port (UFP) facilitates direct connection of module 50 to a host unit, such as host unit 20, or to other modules connected between module 50 and host unit 20. In one implementation, connector port 56 is in the form of a plug receivable within port 24 formed of the receptacle. In other implementations, this relationship may be reversed. Connector port 58 comprises a "downstream" facing port (DFP), facilitating connection of module 50 to other modules in a modular computing system, wherein module 50 is connected between the other "downstream" modules and host unit 20 and wherein module 50 facilitates indirect connection of the other modules to host unit 20.

In one implementation, ports 56 and 58 are substantially similar to one another in that each of such ports comprises at least one data bus 66 and a power delivery bus 70. In one implementation, each of such connector ports 56 and 58 comprise Universal Serial Bus type C receptacle interface or port. In yet other implementations, such connector ports 56 and 58 may comprise other types of receptacle interfaces or ports having at least one data bus 66 and a power delivery bus 70.

Controller 64 comprises a processing unit that follows instructions contained in a non-transitory computer-readable medium and/or logic elements/circuitry within the housing of module 50. Controller 64 controls the transmission of messages from and the receipt of messages by module 50. Controller 64 may control additional functions or operations of module 50 as well. In one implementation, controller 64 may operate in an alternate "mode" pursuant to a communications protocol based upon structured vendor defined messages.

Controller 64 facilitates transmission of messages or other communication between other modules indirectly connected to host unit 20 across or using power delivery bus 70. Controller 64 may transmit a message (in accordance with a structured vendor defined messaging protocol) from a module connected to module 50 by the downstream Universal Serial Bus type C port 58 to a module connected to the module 50 by the upstream Universal Serial Bus type C port 56 across the power delivery bus 70 of the upstream Universal Serial Bus type C port 56. Likewise, controller 64 may transmit a message from a module connected to module 50 by the upstream Universal Serial Bus type C port 56 to a module connected to the module 50 by the downstream Universal Serial Bus type C port 58 across the power delivery bus 70 of the downstream Universal Serial Bus type C port 58.

Figure 3:
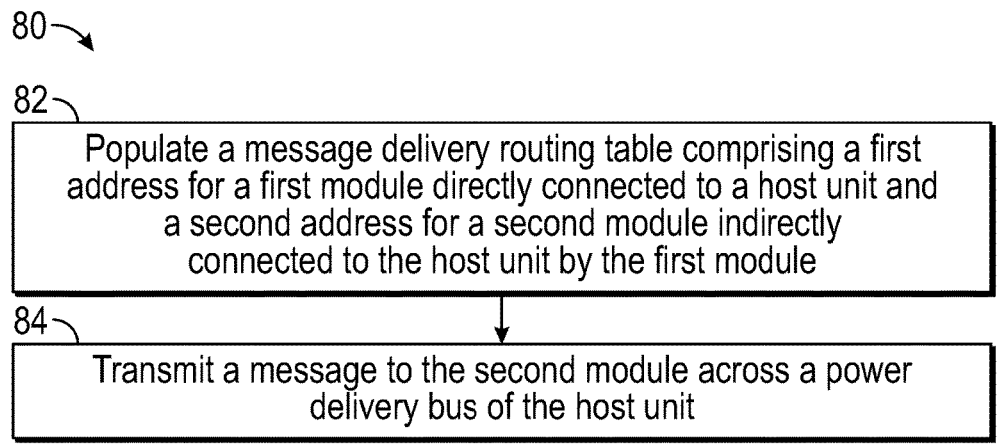
FIG. 3 is a flow diagram of an example method for facilitating the transmission of messages between indirectly connected devices in the form of a host unit or modules across a power delivery bus, such as a power delivery bus of a host unit.

FIG. 3 is a flow diagram of an example method 80 facilitating the transmission of messages between indirectly connected devices in the form of a host unit or modules across a power delivery bus, such as a power delivery bus of a host unit. Although method 80 is described as being carried out by modular computing system 10, it should be appreciated that method 80 may be carried out with other modular computing systems described hereafter or other similar modular computing systems.

As indicated by block 82, a message delivery routing table 38 is populated by controller 34. The message delivery routing table 38 comprises a first address (A1) for a first module M1 directly connected to the host unit 20 and a second address (A2) for a second module M2 indirectly connected to the host unit by the first module M1. As indicated by block 84, the message is transmitted by controller 34 to the second module M2 across a power delivery bus 30 of the host unit 20.

Figure 4:
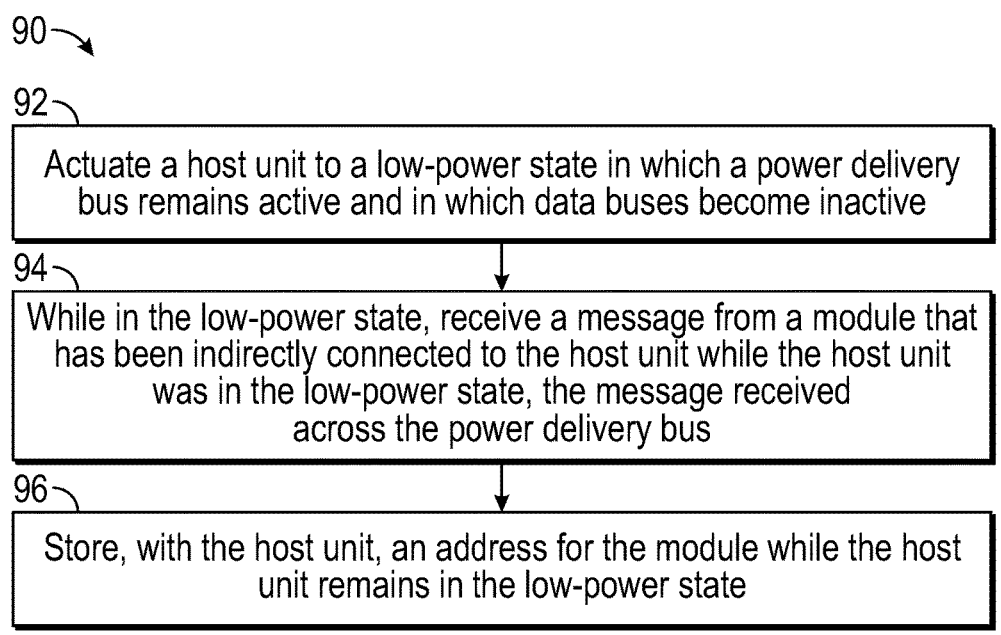
FIG. 4 is a flow diagram of an example method for discovering the connection of a new module to a modular computing system.

FIG. 4 is a flow diagram of an example method 90 for discovering the connection of a new module to a modular computing system. Although method 90 is described as being carried out with module computing system 10, it should be appreciated that method 90 may be carried out with any of the modular computing systems described hereafter or with other similar modular computing systems.

As indicated by block 92, host unit 20 is actuated to a low-power state in which the power delivery bus 30 remains active and in which data buses 26 become inactive. As indicated by block 94, while host unit 20 is in the low-power state, host unit 20 receives a message from a module, such as module M2, that is been indirectly connected to the host unit 20 while the host unit 20 was in the low-power state. The messages received across the power delivery bus 30. As indicated by block 96, controller 34 of host unit 20 stores an address for the module M2 while the host unit 20 remains in the low-power state.

Figure 5:
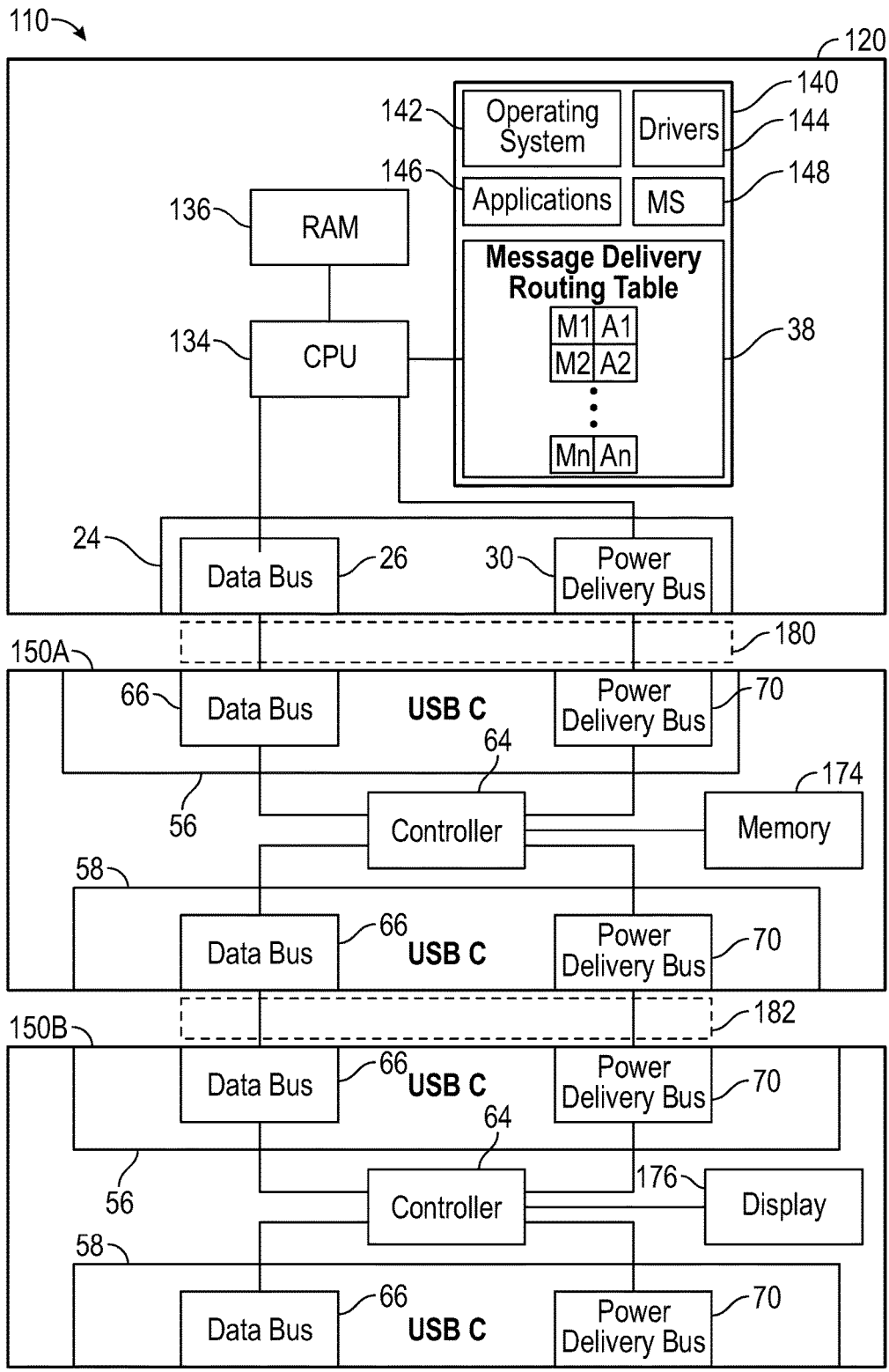
FIG. 5 is a block diagram schematically illustrating portions of an example modular computing system.

FIG. 5 is a block diagram schematically illustrating portions of another example modular computing system 110. Modular computing system 110 comprises host unit 120 and connected modules 150A, 150B (collectively referred to as modules 150). As with system 10, system 110 facilitates communication between non-adjacent devices of the device tree across a power delivery bus. In some implementations, system 110 facilitates the transmission of information, the power button events, power LED events, configuration events and user interface events utilizing the power delivery bus when the host unit or devices are in a low power mode or sleep state.

Host unit 120 is similar to host unit 20 described above except that host unit 120 specifically illustrated as comprising a controller in the form of a central processing unit 134 and additionally comprising various computing components, in the form of hardware or software, such as random access memory 136 and memory 140 which stores message delivery routing table 38, operating system 142, drivers 144, applications 146 and memory storage 148. Those remaining components of host unit 120 which correspond to components of host unit 20 are numbered similarly.

Modules 150 comprise units that are releasably connected, directly or indirectly, to host unit 120. Each of modules 150 provides supplemental functions or capabilities for host unit 120. Each of modules 150 is similar to module 50 described above except that module 150A is illustrated as additionally comprising persistent memory storage device 174 and module 150B is illustrated as additionally comprising display 176. In one implementation, the persistent memory storage device may comprise a hard disk drive. Those remaining components of modules 150 which correspond to module 50 described above are numbered similarly.

In the example illustrated, module 150A is directly connected to host unit 120 by an intermediate cable 180 (shown in broken lines) connected between port 24 of host unit 120 and port 56 of module 150A. In other implementations, module 150A may be connected to host unit 120 by a plug-receptacle connection. Module 150B is directly connected to module 150A and is indirectly connected to host unit 120 by intervening module 150A. Module 150B is directly connected to module 150A by an intermediate cable 182 (shown in broken lines). In other implementations, module 150B may be connected to module 150A by a plug-receptacle connection.

Central processing unit 134, serving as a controller, populates message delivery routing table 38 with information pertaining to module 150A, such as its assigned address, in response to module 150A being connected to host unit 120. Likewise, central processing unit 134 populates message delivery routing table 38 with information pertaining to module 150B, such as its assigned address, in response to module 150B being connected to module 150A. Central processing unit 134 utilizes the address and other information contained method delivery routing table 38 to send messages or otherwise communicate with module 150B across power delivery bus 30 and power delivery buses 70. Likewise, central processing unit 134 further communicates the stored and assigned address information to each of the connected devices, facilitating communication between non-adjacent modules across power delivery buses 70. For example, in one implementation, such communication may be pursuant to an alternate mode in which a predetermined protocol of structured vendor supplied messages is utilized to communicate across a power delivery buses 70. Such communication may be carried out while host device 120 and modules 150 are in a low-power state.

FIG. 6 is a schematic diagram of an example downstream facing port 258 in the form of a USB type C receptacle interface. In one implementation, the upstream facing port 56 may also comprise a USB type C connection, but in the form of a plug received within such a receptacle. As shown by FIG. 6, port 258 comprises ground contacts A1, A12, B12 and B1; high-speed USB3 channel 1 contacts A2, A3, B11, B10; high-speed USB three channel 2 contacts A10, A11, B3, B2; ground return contacts A1, A12, B1, B12; sideband use contacts A8, B8; bus power contacts A9, B9; and power delivery buses or configuration channels A5, B5.

Figure 7:
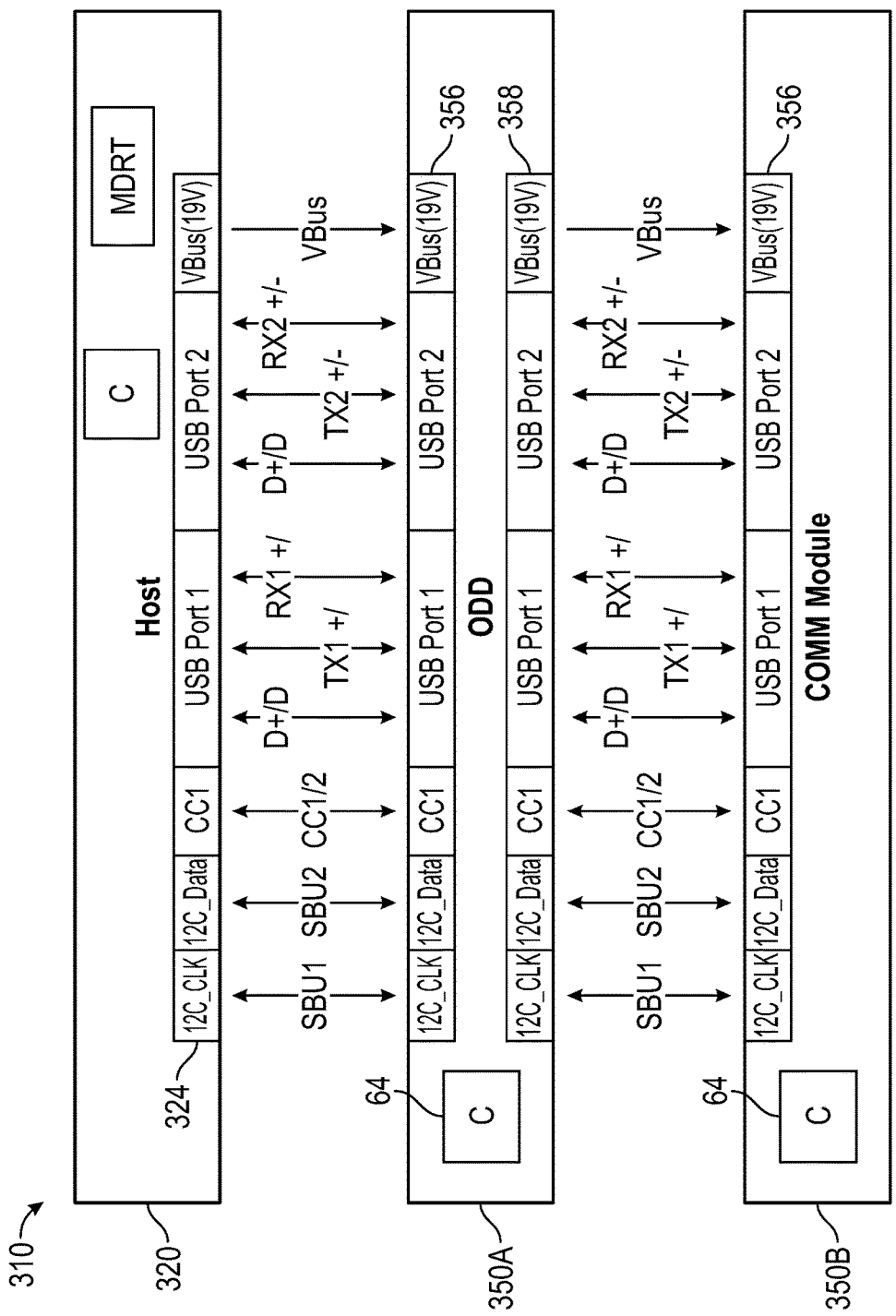
FIG. 7 is a block diagram schematically illustrating portions of another example modular computing system.

FIG. 7 schematically illustrates an example modular computing system 310 comprising a host unit 320 and two modules 350A, 350B (collectively referred to as modules 350) connected to host unit 320. Host unit 320 is similar to host unit 120 described above except that host unit 320 is specifically illustrated as comprising downstream facing port 324 in the form of a USB type C receptacle interface. Module 350A is similar to module 150A described above except that module 350A comprises an upstream facing port 356 and a downstream facing port 358, each of such ports comprising a USB type C receptacle interface. Module 350 comprises a controller 64 that directs routing of messages or signals between upstream facing port 356 and downstream facing port 358.

Module 350B is similar to module 150B described above except that module 350B comprises an upstream facing port 356 also in the form of a USB type C receptacle interface. As shown by FIG. 6, each of the USB type C receptor interface comprises data buses the form of USB Port 1 and USB Port 2 and a power delivery bus in the form of CC1/2. In one implementation, module 350A may comprise an optical disk drive (ODD) while module 350 comprises a communications module. In yet other implementations, modules 350 may comprise other devices such as an input output module, providing additional USB or other input/output ports for system 310, facilitating the connection of peripherals such as keyboards, a mouse other input/output devices, or a hard disk drive module.

Figure 8:
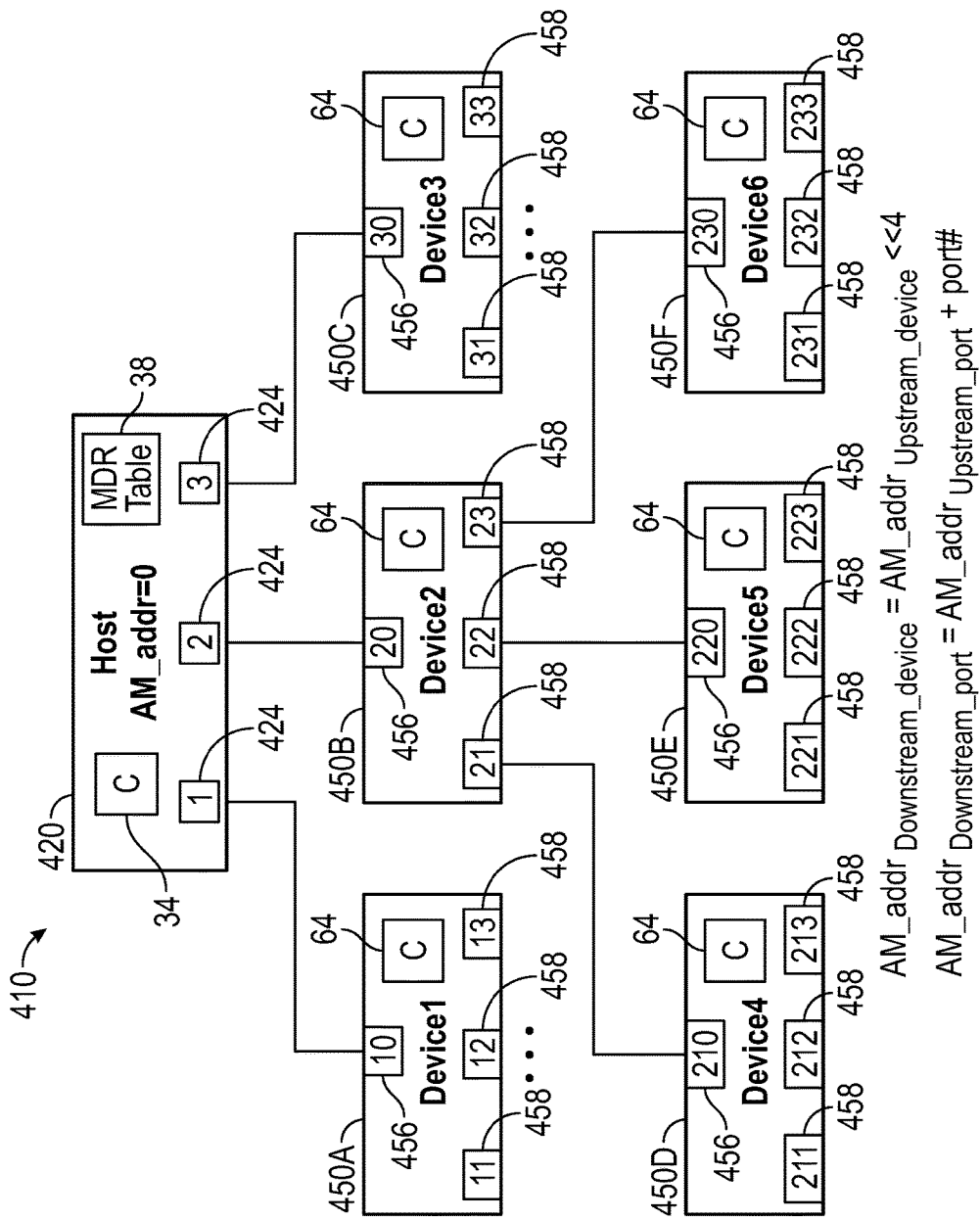
FIG. 8 is a block diagram schematically illustrating portions of another example modular computing system.

As described above with respect to modular computing systems 10 and 110, host unit 320 comprises a controller 34 that populates a message delivery routing table 38. The method delivery routing table 38 comprises a first address module 350A and a second address for module 350B. Controller 34 communicates with module 350B across the power delivery bus, across CC1/2, based upon the message delivery routing table 38. In one implementation, controller 34 operates pursuant to an alternate mode communicating across the power delivery bus according to a predefined protocol of structured vendor defined messages FIG. 8 is a block diagram schematically illustrating an example modular computing system 410 in the form of a tree of devices. System 410 comprises host unit 420 and modules 450A, 450B, 450C, 450D, 450E and 450F (collectively referred to as modules 450). Host unit 420 is similar to host unit 20 or 120 described above except that host unit 420 is illustrated as comprising 3 downstream facing ports 424, ports 1, 2 and 3. Each of ports 1, 2 and 3 may comprise a USB type C receptacle interface is illustrated above in FIG. 6. As such, each of ports 1, 2, and 3 comprises a data bus provided by USB Port 1, USB Port 2 and a power delivery bus (configuration channel) provided by CC1/2.

Modules 450 comprise devices or modules connected directly or indirectly to host unit 420. In the example illustrated, each of modules 450 comprises an upstream facing port (UFP) 456 and multiple downstream facing ports (DFPs) 458. Like module 350A, module 450 comprises a controller 64. Module 450 may comprise other componentry that provide supplemental capabilities or functions for the modular computing system. Although module 450 is illustrated as comprising three downstream facing ports 458, in other implementations, module 450 may comprise two or greater than three downstream facing ports. In some implementations, module 450 may omit downstream facing ports, such as wherein module 450 is a last module of a series of modules connected to a host unit 420.

Similar to host unit 320 of modular computing system 310 described above, host unit 420 of computing system 410 comprises a controller 34 that populates a message delivery routing table 38. The message delivery routing table 38 comprises addresses for each of modules 450. Controller 34 communicates with individual modules 450 across the power delivery bus, across CC1/2 based upon the addresses stored in message delivery routing table 38. In one implementation, controller 34 generates and assigns an address to each connected module 450 corresponding to or based upon port number of the immediately adjacent upstream host unit/module multiplied by predetermined factor based upon a maximum number of downstream ports of any module connected directly or indirectly to the host unit 420.

In the example illustrated, the controllers 34, 64 of the devices (host unit 420 in the modules 450) operate in a power delivery bus communication alternate mode wherein the controller of an upstream device generates and communicates a base address for the next adjacent downstream devices as each downstream device is connected to the upstream device. The signed address for each downstream device is further communicate upstream to host unit 420 for populating and updating message delivery routing table 38.

In one implementation, for each port of each of the downstream modules connected to host unit 420, addresses are generated using octal values (3 bits) for a system having modules with a maximum number of seven downstream ports. The maximum number of downstream ports is according to $2^n-1$, where n is the number of bits. In other implementations, the address as may be represented in other binary factors or a decimal factor.

In the example illustrated, host unit 420 has a base address of 0. Each downstream module is assigned a base address corresponding to the address of the upstream port to which the module is connected, left shifted by three bits. The address of each downstream facing port on each module 450 corresponds to the base address of the module plus the port number. For example, controller 34 of host unit 420 assigns module 450B with the base address of "20", corresponding to the upstream port "2" of host unit for 20 to which module 450B is connected, left shifted by three bits (2<<3=20). The downstream ports of module 450B are assigned addresses corresponding to the base address of module 450B (20) plus the port number, resulting in the downstream ports of module 450B having addresses 21, 22 and 23 for ports 1, 2 and 3, respectively. Likewise, module 450E has a base address corresponding to the upstream port "22" to which module 450E is directly connected, left shifted by three bits (22<<3=220). The downstream ports of module 450E are assigned addresses corresponding to the base address of module 450E (220) plus the port number, resulting in the downstream ports of module 450E having addresses 221, 222 and 223 for ports 1, 2 and 3, respectively. This addressing scheme is applied by controller 34 to each of modules 450 connected to host unit 420. These generated and assigned addresses are stored by controller 34 in the message delivery routing table 38.

In other implementations, the predetermined factor may have other values based upon the maximum number of downstream ports of any individual module of system 410. For example, in lieu of being octal and employing three bits, the addressing scheme employed by system 410 may provide space for other maximum number of downstream ports for an individual device, whether it be a host unit 420 or a module 450.

Figure 9:
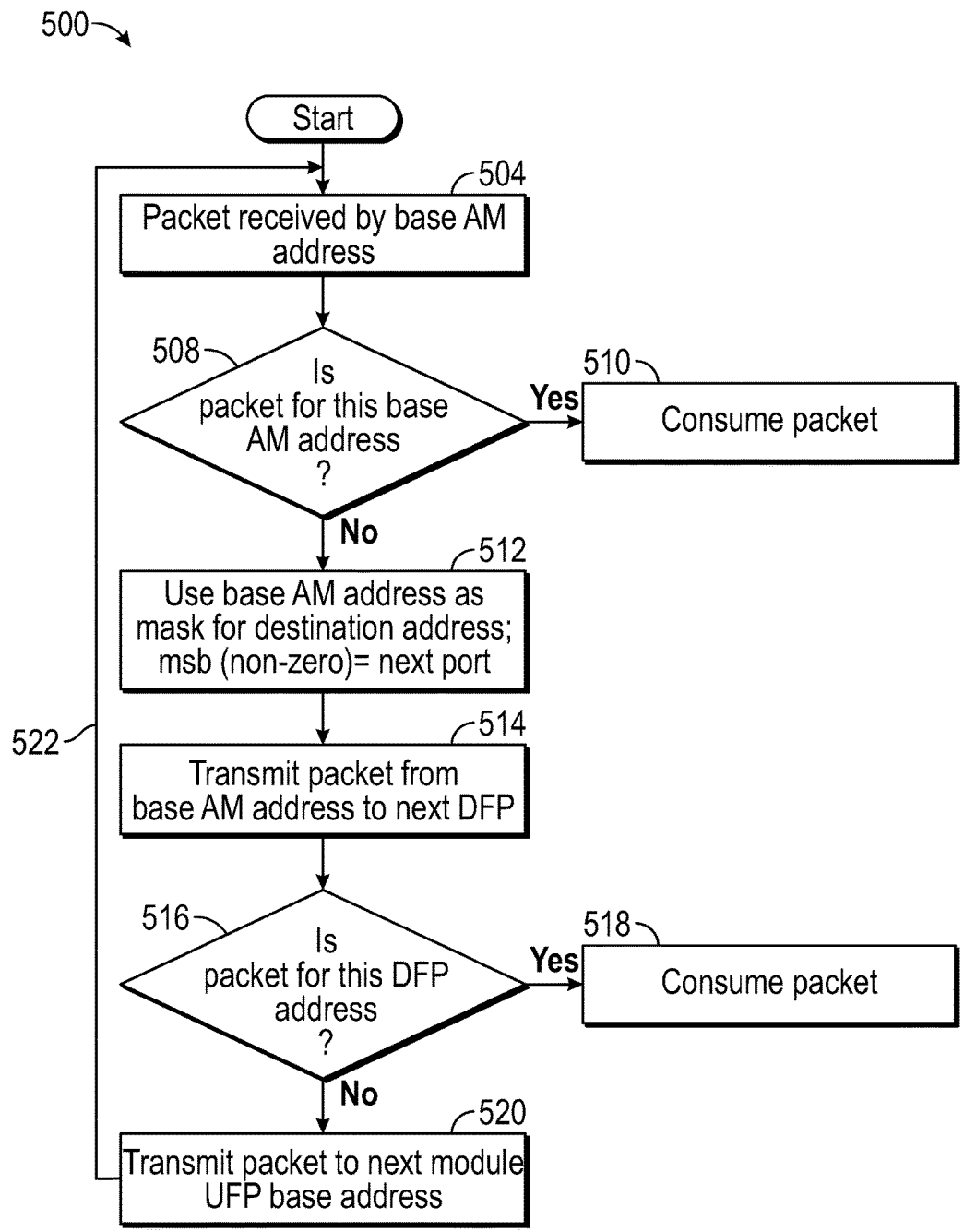
FIG. 9 is a flow diagram of an example method for routing a packet in an upstream direction in the example modular computing system of FIG. 8.

FIG. 9 is a flow diagram of an example method 500 for routing messages/events in a "downstream" direction within the example system 410 across the power delivery bus of the host unit 420 and each of modules 450 using the addressing scheme with the addresses stored in message delivery routing table 38. As indicated by block 504, a packet is received by a base alternate mode (AM) address. In the example illustrated, for modules 450, the base AM address is the address of the upstream facing port 456. For host unit 420, the base AM is 0.

As indicated by decision block 508, the controller of the particular device, whether it be the host controller 34 or the module controller 64, determines (such as by reading data in a header of the packet) whether the received packet has a destination address corresponding to the base AM address. As indicated by block 510, if the particular controller 34, 64 determines that the packet is intended for the base AM address of the device 420, 450, the particular device consumes the packet, such as by carrying out commands or instructions in the packet, using data in the packet or storing data provided by the packet.

As indicated by block 512, in response to determining that the destination contained in the packet does not correspond to the base address of particular device 420, 450, the particular controller 34, 64 determines to what downstream port the packet should be routed. In one implementation, the controller utilizes the base AM of its associated device as a mask for the packets destination address. The most significant nonzero bit of the masked destination address identifies the downstream facing port of the device to which the packet should be routed.

As indicated by block 514, the packet is transmitted from the base AM address of the device to the downstream facing port DFP of the device. As indicated by block 516, the particular controller 34, 64 then determines whether the packet is for the particular DFP of the device. The particular controller 34, 64 determines whether the destination address of the packet corresponds to the address of the downstream facing port that is received the packet. As indicated by block 518, if the particular controller 34, 64 determines that the packet is intended for the DFP AM address of the device 420, 450, the particular device consumes the packet, such as by carrying out commands or instructions in the packet, using data in the packet or storing data provided by the packet. As indicated by block 520, if the particular controller 34, 64 determines that the packet is not for the DFP device associated with the controller 34, 64, the particular controller 34, 64 routes or transmits the packet to address of the upstream facing port 456 of the next module 450.

As indicated by arrow 522, the actions set forth in blocks 504-520 are once again repeated at the next module 450. Although controllers 34, 64 have been described as controlling the routing of packets or messages for all of the upstream facing port and downstream facing ports of each device, in other implementations, a device may comprise multiple controllers, each of the multiple controllers been dedicated to a corresponding port or corresponding subset of ports of the device.

The following is an example of the routing of a message or packet in a downstream direction in module computing system 410, from host unit 420 to port 2 of device 6 having a DFP AM address of 232.

| Packet received by [Host, AM base address] | Address = 0 |
|---|---|
| Is packet for this port: | 232 ≠ 0 |
| No, so correlate the address with my address starting with the most significant digit | 232 0 |
| And use it as a mask | 232 2 |
| Get the most significant non-zero digit to point to the next port | |
| Send the packet to Port 2 | |
| Packet received by [Device2, Port0] | Address = 20 |
| Is packet for this port? | 232 ≠ 20 |
| No, so correlate the address with my address starting with the most significant digit | 232 20 32 |
| And use it as a mask | 3 |
| Get the most significant non-zero digit to point to the next port | |
| Send the packet to Port3 | |
| Packet received by Port3 of Device 2 (450B) | |
| Is packet for this port: | 232 ≠ 23 |
| Send the port to the next downstream device | |
| Packet received by [Device6, Port0] (450F) | Address = 230 |
| Is packet for this port? | 232 ≠ 230 |
| No, so correlate the address with my address starting with the most significant digit | 232 230 2 |
| And use it as a mask | 2 |
| Get the most significant non-zero digit to point to the next port | |
| Send the packet to Port2 | |
| Packet received by Port2 | |
| Is packet for this port: | 232 = 232 |
| Packet is for Port2, so it consumes the packet | |

Figure 10:
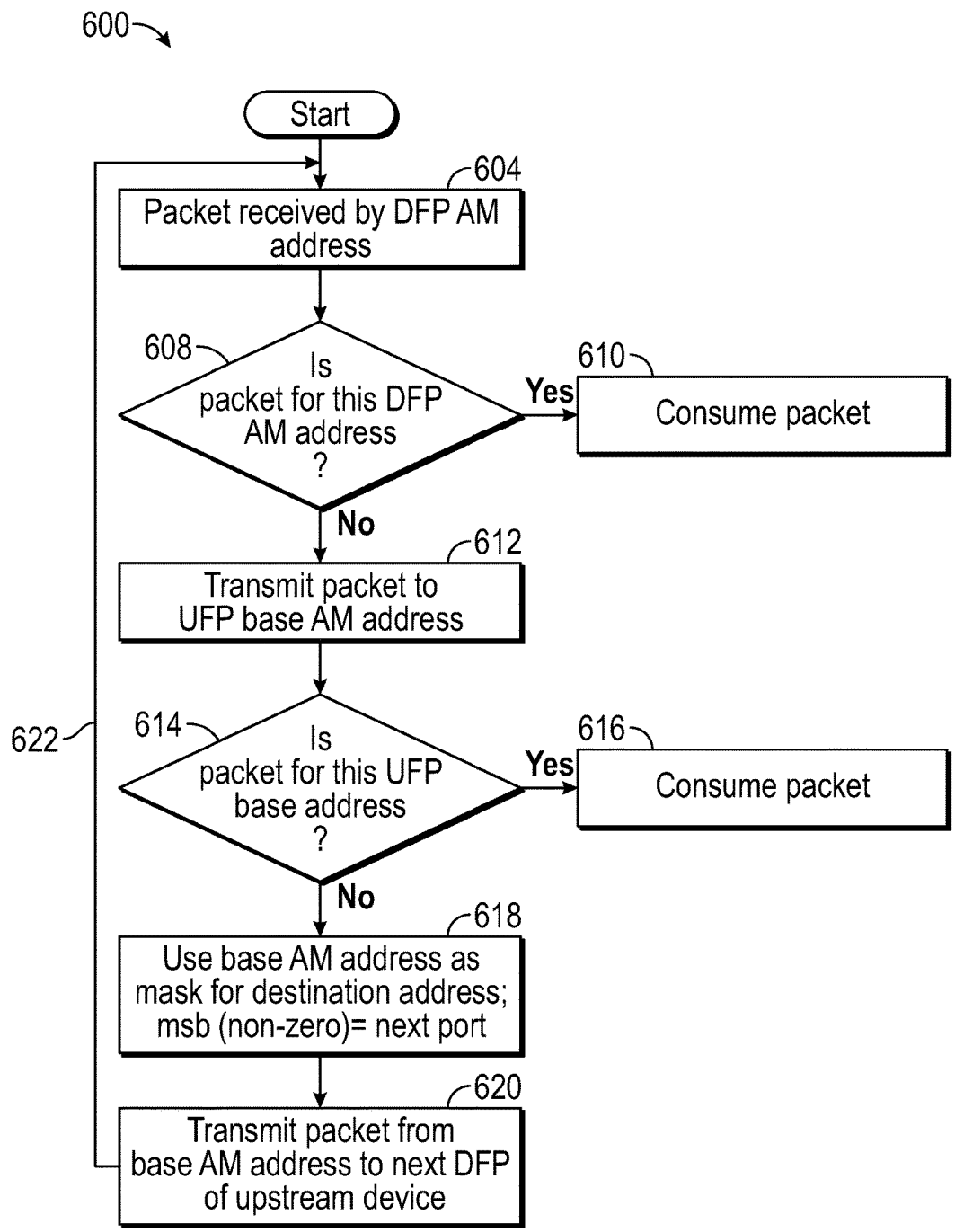
FIG. 10 is a flow diagram of an example method for routing a packet in a downstream direction in the example modular computing system of FIG. 8.

The routing of messages or packets in an upstream direction occurs in a similar fashion. FIG. 10 is a flow diagram of an example method 600 for routing messages/events in a "upstream" direction within the example system 410 across the power delivery bus of the host unit 420 and each of modules 450 using the addressing scheme with the addresses stored in message delivery routing table 38. As indicated by block 604, a packet is received by a DFP alternate mode (AM) address.

As indicated by decision block 608, the controller of the particular device, whether it be the host controller 34 or the module controller 64, determines (such as by reading data in a header of the packet) whether the received packet has a destination address corresponding to the DFP AM address. As indicated by block 610, if the particular controller 34, 64 determines that the packet is intended for the DFP AM address of the device 420, 450, the particular device consumes the packet, such as by carrying out commands or instructions in the packet, using data in the packet or storing data provided by the packet.

As indicated by block 612, in response to determining that the destination contained in the packet does not correspond to the base address of particular device 420, 450, the particular controller 34, 64 routes the packet upstream to the UFP base AM address or port 456 of the same device.

As indicated by decision block 614, the controller of the particular device, whether it be the host controller 34 or the module controller 64, determines (such as by reading data in a header of the packet) whether the received packet has a destination address corresponding to the UFP AM address. As indicated by block 616, if the particular controller 34, 64 determines that the packet is intended for the UFP AM address of the device 420, 450, the particular device consumes the packet, such as by carrying out commands or instructions in the packet, using data in the packet or storing data provided by the packet.

As indicated by block 618, the particular controller 34, 64 determines to what downstream port the packet should be routed. In one implementation, the controller utilizes the base AM of its associated device as a mask for the packets destination address. The most significant nonzero bit of the masked destination address identifies the downstream facing port of the device to which the packet should be routed.

As indicated by block 620, if the particular controller 34, 64 determines that the packet is not for the UFP device associated with the controller 34, 64, the particular controller 34, 64 routes or transmits the packet to address of the downstream facing port 458 of the next upstream device, whether it be another module 450 or host unit 420. As indicated by arrow 622, the actions set forth in blocks 604-620 are once again repeated at the next module 450/host unit 420. The upstream routing of a packet described respect to method 600 may be combined with the downstream routing of a packet as described with respect to method 500 to transmit a packet from one module in one branch to another module in another branch across an intermediate module 450 or across host unit 420, providing point-two-point communication.

Figure 11:
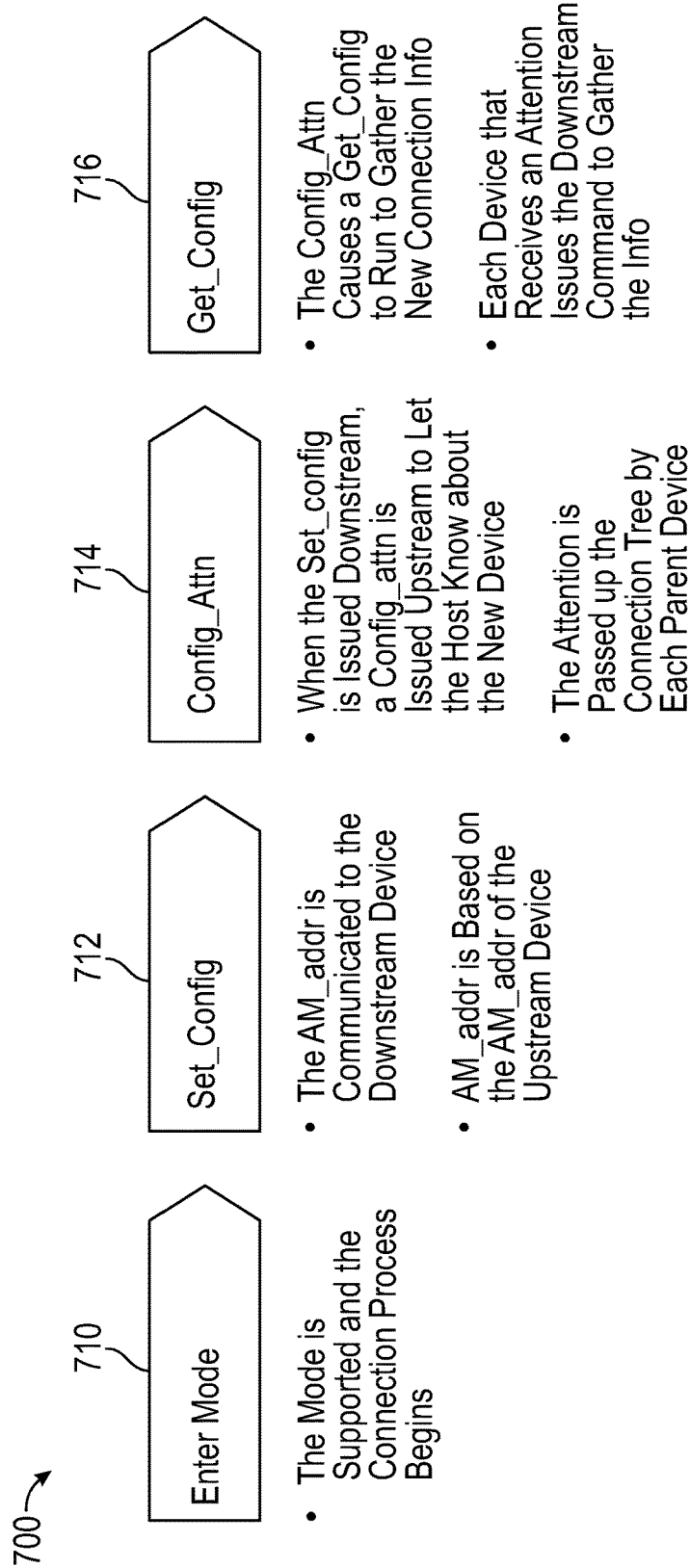
FIG. 11 is a flow diagram of an example method for discovering the addition of a new device to a modular computing system.

FIG. 11 is a flow diagram of an example method 700, illustrating discovery of a new module added to the example system 410 described above. As indicated by block 710, upon connection of a new module 450 to a connected module 450, system 410 enters a device discovery identity phase. During the discover identity phase, the controller 34, 64 controlling the particular port of the connected module to which the new module has been connected communicates with the newly added module 450 to determine whether the module supports the alternate mode and addressing scheme of system 410. Such communication may occur after power delivery specifications have been negotiated between the two devices.

As indicated by block 712, the controller 64 communicates the assigned address (Set-Config) to the newly added module 450. As discussed above, the assigned for the newly added module 450 is based upon the base address of the upstream host 420/module 450 left shifted by three bits. The assigned addresses for the downstream ports of the newly added module 450 are based upon the assigned base address for the newly added module 450 plus the particular port number.

As indicated by block 714, in response to the Set-Config being issued to the newly added downstream module 450, the controller 64 of the immediately adjacent upstream module 450 issues an "Config. Attn" message which is routed upstream to host unit 420, notifying host unit 420 of the addition of the new module 450. As indicated by block 716, in response to receiving the "Config. Attn" message, controller 34 of host unit 420 issues a "Get Config" message or command which is routed downstream, whereby host unit 420 receives information pertaining to the newly added module 450 and whereby host unit 420 may populate message delivery routing table 38 with information pertaining to the newly added module 450. As discussed above, the discovery process may occur in the alternate mode using structured vendor defined message is transmitted across the power delivery bus while host unit 420 and intervening modules 450 are in a low-power state such that their data bus or data buses remain inactive during such discovery.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A modular computing system, comprising:
    a host unit comprising:
        a port comprising;
            a data bus; and
            a power delivery bus; and
        a controller to populate a message delivery routing table comprising a first address for a first module directly connected to the host unit and a second address for a second module indirectly connected to the host unit by the first module, wherein the controller is to communicate with the second module across the power delivery bus based upon the message delivery routing table.

2. The modular computing system of claim 1, wherein the controller is to populate the message delivery routing table with the second address based upon signals received by the second module across the power delivery bus.

3. The modular computing system of claim 2, wherein the controller is to populate the message delivery routing table with the second address based upon signals received by the second module across the power delivery bus while the host unit is in a low-power state in which the data bus is unavailable for communication.

4. The modular computing system of claim 1, wherein the port comprises a Universal Serial Bus type C port.

5. The modular computing system of claim 1, further comprising:
    the first module, the first module comprising:
        a second port comprising:
            a second data bus; and
            a second power delivery bus; and
    the second module, the second module comprising:
        a third port comprising:
            a third data bus; and
            a third power delivery bus, wherein the second module is to transmit a message having a destination address across the second power delivery bus while the second data bus of the first module is unavailable for communication.

6. The modular computing system of claim 1, wherein the port has a host port number, wherein first module has an upstream facing port connected directly to the port of the host unit, the first address corresponding to the host port number multiplied by a predetermined factor based upon a maximum number of downstream ports of any module connected directly and indirectly to the host unit.

7. The modular computing system of claim 1, wherein the message delivery routing table comprises a third address for a third module indirectly connected to the host unit by the first module, wherein the controller is to populate the message delivery routing table with the third address based upon signals received the third module across the power delivery bus while the host unit is in a low-power state in which the data bus is unavailable for communication.

8. The modular computing system of claim 1, wherein the host unit is to populate the message delivery routing table with the second address in response to the second module being connected to the first module while the host unit is in a low-power state.

9. The modular computing system of claim 1, wherein the controller is to transmit a message to the second module across the power delivery bus using the second address while the host unit is in a low-power state.

10. The modular computing system of claim 1, wherein the controller is to receive a message from the second module across the power delivery bus while the host unit is in a low-power state.

11. A method, comprising:
    populating, via a controller of a host unit, a message delivery routing table for a modular computing system, the message delivery routing table comprising a first address for a first module directly connected to the host unit by a port of the host unit and a second address for a second module indirectly connected to the host unit by the first module; and
    transmitting a message to the second module across a power delivery bus of the host unit.

12. The method of claim 11, further comprising:
actuating the host unit to a low-power state in which the power delivery bus remains active and in which data buses of the host unit become inactive;
while in the low-power state, receiving a message from a module that has been indirectly connected to the host unit, the message received across the power delivery bus; and
storing, with the host unit, an address for the module while the host unit remains in the low-power state.

13. The method of claim 12, wherein the power delivery bus and the data buses are part of a Universal Serial Bus type C connector.

14. The method of claim 12, further comprising transmitting a message to the module using the address for the module while the host unit remains in the low-power state.

15. A modular computing system, comprising:
a first module comprising:
  an upstream Universal Serial Bus type C port;
  a downstream Universal Serial Bus type C port; and
  a controller to transmit a message from a second module connected to the first module by the downstream Universal Serial Bus type C port to a third module connected to the first module by the upstream Universal Serial Bus type C port across a power delivery bus of the upstream Universal Serial Bus type C port.

16. The modular computing system of claim 15, further comprising:
a host unit comprising:
  a port comprising:
    a data bus; and
    a power delivery bus; and
  a controller to populate a message delivery routing table comprising a first address for the first module directly connected to the host unit by the port and a second address for a second module indirectly connected to the host unit by the first module, wherein the controller is to communicate with the second module across the power delivery bus based upon the message delivery routing table.

17. The modular computing system of claim 16, wherein the controller is to populate the message delivery routing table with the second address based upon signals received by the second module across the power delivery bus.

18. The modular computing system of claim 17, wherein the controller is to populate the message delivery routing table with the second address based upon signals received by the second module across the power delivery bus while the host unit is in a low-power state in which the data bus is unavailable for communication.

19. The modular computing system of claim 16, wherein the host unit comprises a downstream facing port having a host port number, wherein first module has an upstream facing port connected directly to the downstream facing port of the host unit, the first address corresponding to the host port number multiplied by a predetermined factor based upon a maximum number of downstream ports of any module connected directly and indirectly to the host unit.

20. The modular computing system of claim 16, further comprising the second module, the second module is selected from a group of modules consisting of: a display module; an input-output module; a communications module; an optical disk drive and a hard disk drive.

* * * * *